United States Patent [19]

Howerton

[11] 4,103,505
[45] Aug. 1, 1978

[54] TEMPORARY PROTECTION OR BLOCKING FOR FIELD JOINT IN WEIGHT COATING ON SEA FLOOR PIPELINE

[75] Inventor: John M. Howerton, Newberry, S.C.

[73] Assignee: Phillips Petroleum Company, Bartlesville, Okla.

[21] Appl. No.: 744,055

[22] Filed: Nov. 22, 1976

[51] Int. Cl.$^2$ ............................................... F16L 1/04
[52] U.S. Cl. ...................................... 61/108; 29/446; 138/110; 285/45; 285/288
[58] Field of Search ................. 61/114, 107, 108, 110, 61/111, 114, 109, 112, 54; 29/446; 138/110; 193/2 A; 285/45, 288; 214/1 PA

[56] References Cited

U.S. PATENT DOCUMENTS 3,321,925   5/1967   Shaw ...................................... 61/112

Primary Examiner—Paul R. Gilliam
Assistant Examiner—A. Grosz

[57] ABSTRACT

A gap or space existing in thick concrete coating on sea floor pipeline, as at welded joints, is temporarily filled before lowering pipeline to sea floor. The filling can be constituted with hardwood blocks which can be held in place on the pipeline, as at a welded joint, by conventional steel or other banding retention means surrounding the same. Usually, a circumferential gap or space exists between the end of the thick concrete coating on one segment of pipe and the end of a similar coating on another segment of pipe which have been welded together, the circumferential gap or space existing at the welded portions of the two segments. Ordinarily, the filling or blocks will be on the underside of the pipeline thus to allow it to pass over rollers on the pipelaying barge stinger, thus to avoid damage to the yard-applied concrete coating when pipeline is temporarily laid on the sea bottom as when a storm is expected and then subsequently picked up and hauled back aboard the barge.

2 Claims, 5 Drawing Figures

TEMPORARY PROTECTION OR BLOCKING FOR FIELD JOINT IN WEIGHT COATING ON SEA FLOOR PIPELINE

This invention relates to the laying of a pipeline. In one of its aspects the invention relates to laying a pipeline on a sea floor or bed. In another of its aspects the invention relates to the protection of a gap or a circumferential space extant between concrete-covered segments of pipe which had been welded together at their end portions which are not concrete-covered to prevent injury to the edges of the concrete covering at the gap.

In a concept of the invention, a concrete-covered or weighted pipeline, constructed by welding together segments of pipe which are concrete-covered all but for a short-end portion of each pipe, thus, having circumferential gaps at the welded portions is protected against damage to the concrete near the welded joints when lowered on to the sea floor as when a storm is approaching by filling the circumferential gap or other space in the concrete continuum with a filler material e.g. a hardwood block or blocks of same thickness before lowering the pipeline on to the sea floor. In another concept of the invention, the blocks are cut or shaped to at least cover the underside of the pipeline so that it will pass over rollers on a pipelaying barge stinger both when paying out the pipe and when again hauling it back aboard the pipelaying barge as after a storm. In a further concept of the invention, the hardwood blocks, in one form, are held in place by conventional steel banding or other retention means.

In the laying of a marine line or pipe for conveying say oil or gas as from a well under the sea it is known to apply a Somastic coating of concrete which may have a weight of concrete such as to provide a specific gravity of say 1.2 to 1.4 depending upon water depth and the wave and current conditions.

Laying down the pipe on the sea floor when weather gets too rough, and picking up the pipe to resume lay, are hazardous operations. There appears to be a 75 percent chance or better that the pipe or the stinger will be damaged or both. If the pipe is ruptured and pipe fills with water, there is real problem. It is both time-consuming and expensive to repair the ruptured line. Further, it has been found that there frequently occurs damage to the concrete coating of the line even though there is no buckle or dent in the pipe. Most of the concrete coating damage occurs when laying down the line because of weather and picking up the pipeline end subsequently. A loss of some concrete coating is in itself not a serious matter unless a sizeable length of the pipe loses its coating. The serious matter occurs when, sometimes, the concrete is knocked off the pipe and the corrosion coating is also lost. When the area of bare pipe exceeds a certain amount, then the bare pipe must be provided protection by either re-coating or by adding anodes.

Accordingly, it is desirable and important to provide method and means for protecting the concrete coating and consequently the corrosion-protection coating on the pipe as it passes over the stinger in either direction. Indeed, when it is considered that each segment or joint of pipe might be 50 feet or longer and that the restructuring of the coating ordinarily requires returning the pipe to the pipe-yard on land it can be seen that the provision of some effective protection at the gaps in the concrete coating which can be applied on the laying barge can save many thousands of dollars and much time which otherwise would be required to return the pipe for repair of the damage to its coating.

It is an object of this invention to provide a method for laying a pipeline. It is another object of this invention to provide a means for protecting a coating on a pipeline. It is a further object of this invention to provide method and means for laying a pipeline on to a sea bed. A still further object of the invention is to provide method and means for laying and recovering a pipeline on the sea bed or floor without injury to a coating thereon which is discontinuous as in the case of a gap or uncovered circumferential space as at the place at which segments of pipe which are otherwise covered have been welded together at their ends. A still further object of the invention is to provide means for filling a gap or circumferential recess or discontinuum in the coating of a pipeline constructed of joints butt-welded together.

Other aspects, objects, concepts and the several advantages of the invention are apparent from a study of this disclosure, the drawings and the appended claims.

According to the present invention, damage to the coating on a pipeline when laying the same on a sea bed as by passing the same over a stinger or roller is prevented by filling the discontinuum prior to passing it over the stinger or roller with a filler material which will, together with the coating surrounding the discontinuum, present a rather smooth surface to the stinger or roller.

Thus, damage to the concrete and Somastic coating can be drastically reduced by installing temporary forms as on the bottom half of each field joint not poured, thus the transition of the field joints through the rollers or stinger is a continuous or smooth, even bearing surface which will prevent the rollers from digging into or otherwise damaging the coating at a discontinuum.

In a preferred form of the invention, now the preferred form, the forms are made of hardwood and are of a length along the axis of the pipe to extend from the end of the coating on one segment to the end of the coating on another at the ends of the pipe which have been butt-welded together. Such forms, which have been employed, are 3 × 6 inches and have a length of the field joint and are banded in position prior to the laying of the pipeline on the sea bed.

Approximately 4 to 6 hours barge downtime has actually been saved each time such a pipeline has been recovered from the sea bed. On a single pipeline laying operation a savings of $640,000.00, estimated, was made.

Referring now to the drawings.

Figure 1:
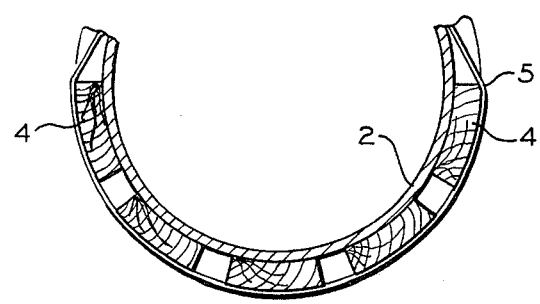
FIG. 1 is a part-view in cross section of a pipeline at the location of a field joint showing the filler material, as made of hardwood, to protect the piping as described herein.
Figure 2:
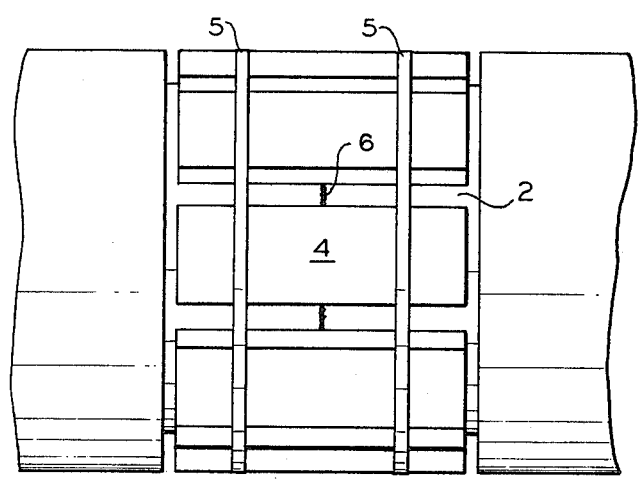
FIG. 2 is a view of the bottom of FIG. 1 showing the wooden segments and the steel banding as applied to the pipe to straddle the butt-welded ends and to reach from the coating on one pipe segment to the coating on the other to provide a continuum of surface.
Figure 3:
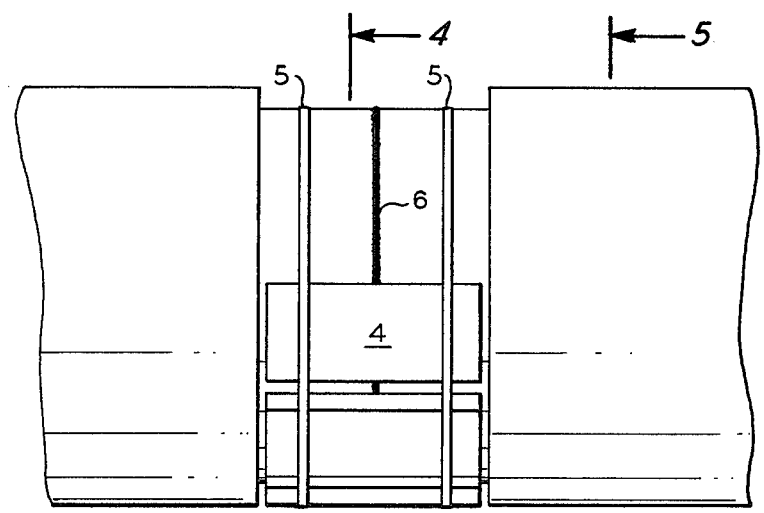
FIG. 3 is a view from the side of the butt-welded segments protected by wooden segments as described herein.
Figure 4:
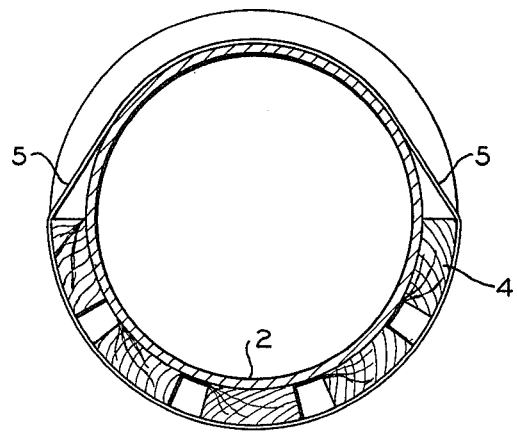
FIG. 4 is a cross-sectional view taken along the line 4—4.

Referring now to the drawings, a pipe 2 is protected by segments of hardwood 4, secured at least to the underhalf of the butt-welded pipe joints by steel bands 5. The weld is shown at 6.

Figure 5:
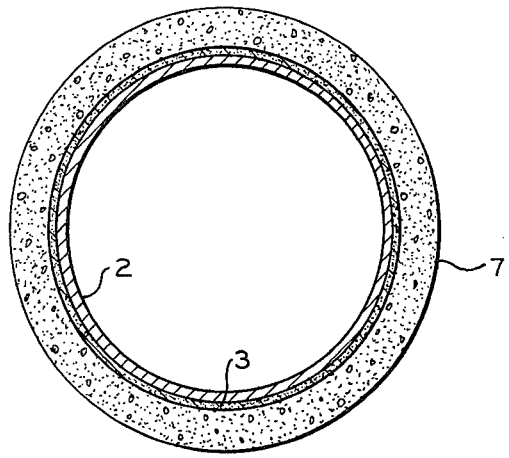
FIG. 5 is a cross-sectional view taken along the line 5—5.

As shown in FIG. 5, the Somastic coating 3 which is an asphalticconcrete type coating for corrosion protection can be of the order of about ⅝ of an inch thick. The concrete coating 7 primarily for weighting and protection can vary from about 1½ inches to about 6 inches in thickness.

It will be seen that the protective means of the invention is simple to apply and to remove and even easy to construct.

Reasonable variation and modification are possible within the scope of the foregoing disclosure, drawings, and the appended claims to the invention the essence of which is that a discontinuum in a coating on a pipeline is filled as with hardwood members secured by a steel band, the filling being at least to provide a smooth surface or continuum on that part of the pipe which passes over a stinger or roller as when the pipe must be at least temporarily layed on the sea bottom or bed as when weather interrupts pipe laying and then must later be recovered.

I claim:

1. A method of at least temporarily releasing the end of a coated pipeline from a pipelaying means on to the bottom of the sea bed, as when pipelaying must be temporarily discontinued, and when there are in the coating of the pipeline, as at welded ends of sections of pipe constituting said pipeline, gaps or a discontinuum in the coating thereon which have not yet been filled with a permanent coating, while protecting against damage to the coating as the gap or discontinuum presenting portion passes over rollers or a stinger which comprises temporarily filling the discontinuum with a temporary filler of the same approximate thickness as the coating in a manner to provide a continuum or even surface to prevent damage of the coated end as it passes over the rollers or stinger, said temporary filler being composed of pieces of wood banded together by at least one steel band.

2. A coated pipeline having a discontinuum in the coating, prepared for passing the pipeline over a roller or stinger without damage to the coating, the discontinuum (gap) containing a temporary filler material retained in said discontinuum, said discontinuum being at the butt-welded ends of coated segments of pipe constituting said pipeline, and the filler being composed of wood slats covering at least the underside of the pipe which will pass over rollers or stinger when laid and/or recovered from the sea bed the slats being held to the pipe, in place, by at least one steel band.

* * * * *